(12) United States Patent
Yamawaki

(10) Patent No.: US 6,507,427 B1
(45) Date of Patent: Jan. 14, 2003

(54) SCANNING OPTICAL DEVICE AND METHOD OF REGULATING IMAGING POSITION THEREOF

(75) Inventor: Takeshi Yamawaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/606,022

(22) Filed: Jun. 29, 2000

(30) Foreign Application Priority Data

Jul. 5, 1999 (JP) ............................................. 11-190075

(51) Int. Cl.[7] ............................................. G02B 26/08
(52) U.S. Cl. ........................ 359/210; 359/206; 359/216
(58) Field of Search ................................. 359/206, 209, 359/210, 212, 216, 217; 347/98, 138, 242

(56) References Cited

U.S. PATENT DOCUMENTS

| | | | | |
|---|---|---|---|---|
| 5,257,125 A | * | 10/1993 | Maeda | 359/210 |
| 5,612,767 A | * | 3/1997 | Iwama | 399/98 |
| 5,943,153 A | * | 8/1999 | Naiki et al. | 359/210 |
| 5,966,232 A | | 10/1999 | Kimura et al. | |
| 6,046,835 A | | 4/2000 | Yamawaki et al. | |
| 6,108,115 A | | 8/2000 | Kimura et al. | |

FOREIGN PATENT DOCUMENTS

JP      10-206783      8/1998

* cited by examiner

*Primary Examiner*—Mark A. Robinson
(74) *Attorney, Agent, or Firm*—Fitzpatrick, Cella, Harper & Scinto

(57) ABSTRACT

A scanning optical device to be used for an image forming apparatus such as a laser beam printer and a digital copying machine comprises a light source such as a semiconductor laser, an optical deflector having a deflection surface for deflecting the light beam emitted from the light source in the main-scanning direction, a first optical system for causing the light beam emitted from the light source to strike the deflection surface as a linear image extending in the main-scanning direction, and a second optical system for focussing the light beam deflected by the optical deflector on a surface to be scanned. The first optical system comprises a first lens, a second lens and a cylindrical lens showing refractive power only in the sub-scanning direction, preferably as well as part of the second optical system shared with the latter. The second lens and/or the cylindrical lens are movable along the optical axis to regulate the imaging position of the light beam on the surface to be scanned.

22 Claims, 2 Drawing Sheets

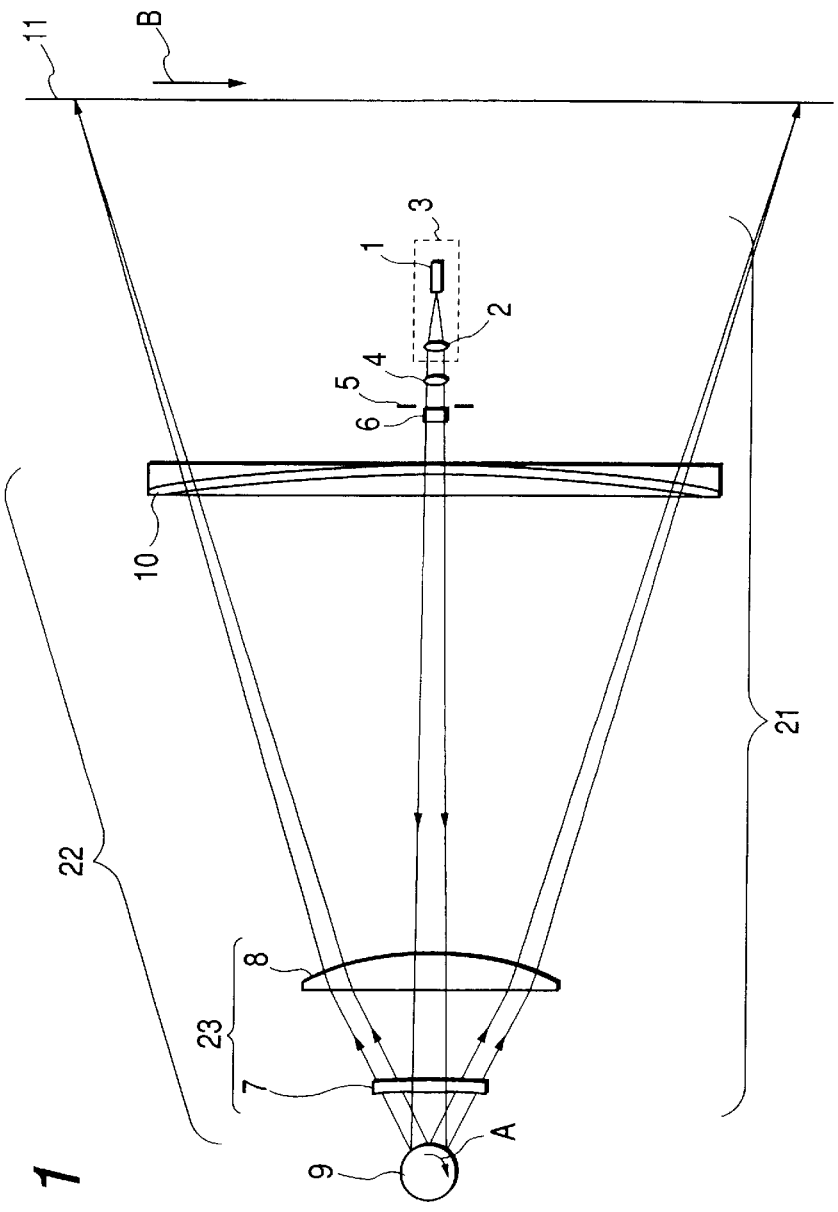
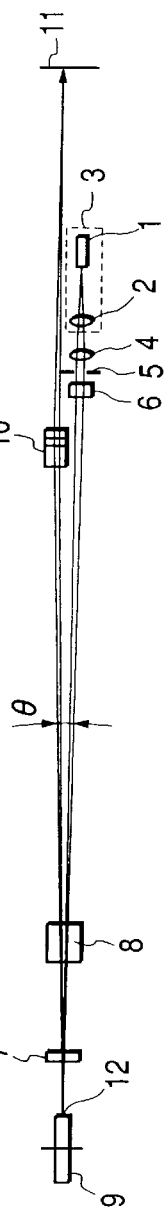
FIG. 1
FIG. 2

SCANNING OPTICAL DEVICE AND METHOD OF REGULATING IMAGING POSITION THEREOF

BACKGROUND OF THE INVENTION

1. Field of the Invention

This invention relates to a scanning optical device and a method of regulating the imaging position in such a device. The scanning optical device of the invention can suitably be used for image forming apparatus which may be laser beam printers and digital copying machines.

2. Related Background Art

Scanning optical devices using a so-called overfilled optical system (OFS) are known as means effective for high speed and high resolution imaging. The overfilled optical system is characterized by the use of a rotary polygon mirror having a large number of reflection surfaces (deflection surfaces) and a light beam having a large width that irradiates any of the reflection surfaces. Since the reflection surfaces of the rotary polygon mirror are required only to have a substantial width necessary for deflection scanning in the wide light beam striking it, the rotary polygon mirror having a large number of reflection surfaces can reduce its diameter to make it suitable for high speed operation.

However, on the other hand, with the overfilled optical system, each of the reflection surfaces of the rotary polygon mirror moves in the wide light beam, changing it s angle relative to the latter as the polygon mirror revolves. Thus, if the width of the light beam is 1 when the optical axis is perpendicular to the reflection surface receiving it and the angle of rotation of the polygon mirror is θ, the reflected light beam shows a width D expressed by formula (1) below.

$$D = l \cdot \cos \theta \tag{1}$$

In other words, the spot of light formed on the surface to be scanned by the light beam incessantly changes its diameter in the main-scanning direction. Additionally, when a semiconductor laser is used for the light source of the scanning optical device, the light beam striking the rotary polygon mirror shows an intensity distribution referred to as Gaussian distribution. Thus, as the reflection surface moves in the light beam showing such an intensity distribution, the energy of the reflected (deflected) light beam changes as a function of the rotary motion of the reflection surface. Therefore, an image forming apparatus comprising an overfilled optical system is accompanied by the problem that the produced image shows an uneven density due to the change in the energy of the deflected light beam.

Since the overfilled optical system intrinsically has the above described characteristics, it is desirable that the light beam strikes the rotary polygon mirror along the optical axis of the scanning lens system (fθ lens system) so that the scanning angle of rotary polygon mirror may swing symmetrically. With this arrangement, the light beam emitted from the light source strikes the rotary polygon mirror substantially along the center line of the deflection angle of the polygon mirror in the main-scanning section, i.e. a plane intersecting the optical axis along the main-scanning direction.

It is also desirable t hat the light beam strikes the rotary polygon mirror aslant in the sub-scanning section, i.e. a plane intersecting the optical axis along the sub-scanning direction, in order to avoid interference of the light beam striking the polygon mirror and the scanning light beam (deflected light beam) reflected by the polygon mirror. In other words, the light beam emitted from the light source desirably strikes the rotary polygon mirror with a predetermined angle and not perpendicularly relative to the deflection surface of the optical deflector in the sub-scanning section. Note that an angle of about 1 degree is selected f or the angle of incidence of the light beam striking the deflection surface in order to avoid any possible degradation of the image produced by the scanning optical device performing so-called deflection scanning so that the light beam striking the polygon mirror is completely isolated from the deflected light beam.

The scanning lens system of the scanning optical device is arranged near the rotary polygon mirror and the deflected light beam is focussed on the surface to be scanned and made to scan the surface at a constant scanning speed in the main-scanning direction. A lens having refractive power in the sub-scanning direction is arranged near the surface to be scanned to focus the deflected light beam in the sub-scanning direction. The incident light beam is also transmitted through the scanning optical system because of the positional arrangement of the latter so that the latter operates also as part of the optical system for incident light.

The optical system for incident light includes a condenser lens and a cylindrical lens for converging the light beam in the sub-scanning direction that are arranged between the light source and the scanning lens system. Thus, the light beam emitted from the light source is focussed to form a substantially linear image (extending in the main-scanning direction) near the reflection surface of the rotary polygon mirror by these lenses and the scanning lens system.

If the number of surfaces of the rotary polygon mirror is N, the scanning width of the light beam on the surface to be scanned is W and the scanning efficiency is η, the focal length f of the scanning lens system is expressed by formula (2) below.

$$W = 4\pi \eta f / N \tag{2}$$

If N=12, W=352.2 (mm) and η=0.9 are selected to fully exploit the characteristics of the overfilled optical system, f will be equal to 345 (mm) to realize a considerably long focal length for the scanning lens system. When the scanning lens system is made to have a long focal length, the position of the image on the surface to be scanned is significantly affected by the surface accuracy of the lenses of the lens system in terms of the displacement of the image so that the lenses have to be processed with an enhanced level of accuracy. When, on the other hand, the diameter of the spot of light formed on the surface to be scanned is reduced in the main-scanning direction to achieve a high degree of resolution, the depth of focus is reduced to by turn reduce the tolerance for the displacement of the imaging position of the scanning lens system. Any measures for alleviating these problems are costly.

Japanese Patent Application Laid-Open No. 10-206783 proposes a method of regulating the imaging position in the main-scanning direction of a scanning optical device by using a laser assembly where the position of the light source can be regulated by means of a holding member so that the operator can regulate the imaging position, while observing it on the surface to be scanned.

However, since the overfilled optical system shows a low efficiency of utilizing the quantity of light produced by the light source, the use of a semiconductor laser having a large output power exceeding 10 mW is normally required. Such a light source is apt to be damaged or otherwise degraded. This means that the light source should be regarded as consumable and therefore it should be arranged in the device as a component that can be replaced with ease. Otherwise, the entire output system should be elaborately regulated each time the light source is replaced to consequently raise the cost of running the device. In other words, the above known method of using a light source that can be positionally regulated is disadvantageous in terms of the use of a replaceable light source.

Another known method of regulating the imaging position of the overfilled optical system consists in unitizing the light source and the condenser lens and moving the unit along the optical axis.

However, to make this known method feasible, the unit has to be movable by several millimeters. Then, a mechanism that allows the unit to move by several millimeters is required to be subjected to a narrow tolerance for parallelism and eccentricity. Parts satisfying such a rigorous requirement are as a matter of fact costly.

SUMMARY OF THE INVENTION

In view of the above problems of the prior art, it is therefore the object of the present invention to provide a scanning optical device having an inexpensive configuration that allows to regulate the imaging position on the surface to be scanned easily and accurately and a method of regulating the imaging position of such a scanning optical device.

According to the invention, the above object is achieved by providing a scanning optical device comprising:

a light source;

an optical deflector having a deflection surface for deflecting the light beam emitted from the light source in the main-scanning direction;

a first optical system for causing the light beam emitted from the light source to strike the deflection surface of the optical deflector as a long linear image extending in the main-scanning direction; and a second optical system for focussing the light beam deflected by the optical deflector on a surface to be scanned; the first optical system comprising a first lens, a second lens and a cylindrical lens showing refractive power in the sub-scanning direction perpendicular to the main-scanning direction, at least either the second lens or the cylindrical lens being movable along the optical axis to regulate the imaging position of the light beam on the surface to be scanned.

In another aspect of the present invention, there is provided an image forming apparatus comprising:

a scanning optical device having the above constitution;

a photosensitive member arranged at the surface to be scanned;

a developing unit for developing an electrostatic latent image formed on the surface of the photosensitive member by the light beam made to scan the surface by means of the scanning optical device into a toner image;

a transfer unit for transferring the developed toner image onto a toner image receiving member; and a fixing unit for fixing the transferred toner image on the toner image receiving member.

In still another aspect of the present invention, there is also provided a method of regulating the imaging position on a surface to be scanned of an scanning optical device comprising a light source, an optical deflector having a deflection surface for deflecting the light beam emitted from the light source in the main-scanning direction, a first optical system for causing the light beam emitted from the light source to strike the deflection surface of the optical deflector as a long linear image extending in the main-scanning direction and a second optical system for focussing the light beam deflected by the optical deflector on the surface to be scanned, the first optical system comprising a first lens, a second lens and a cylindrical lens showing refractive power in the sub-scanning direction perpendicular to the main-scanning direction, the method comprising steps of:

regulating the imaging position of the light beam on the surface to be scanned in the main-scanning direction by moving the second lens along the optical axis; and regulating the imaging position of the light beam on the surface to be scanned in the sub-scanning direction by moving the cylindrical lens along the optical axis.

BRIEF DESCRIPTION OF THE DRAWINGS

FIG. 1 is a schematic cross sectional view of a principal portion of Embodiment 1 of scanning optical device according to the invention as taken along the main-scanning direction.

FIG. 2 is a schematic cross sectional view of a principal portion of Embodiment 1 of scanning optical device according to the invention as taken along the sub-scanning direction.

DETAILED DESCRIPTION OF THE PREFERRED EMBODIMENTS

[Embodiment 1]

Figure 3:
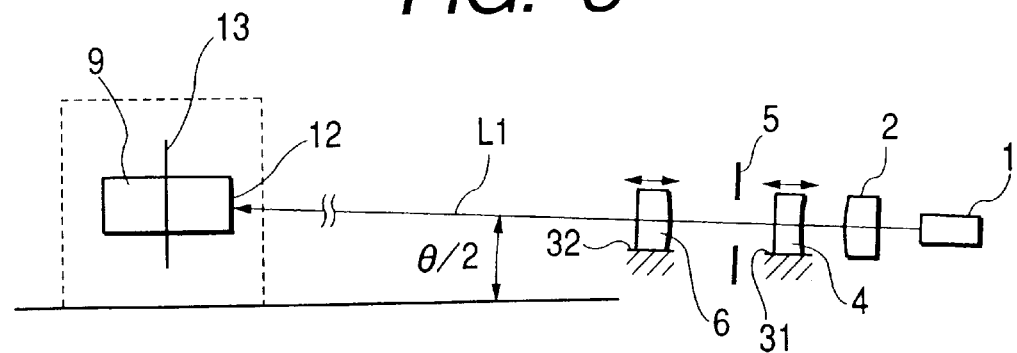
FIG. 3 is a schematic cross sectional view of a principal portion of Embodiment 1 of scanning optical device according to the invention as taken along the sub-scanning direction, showing part of the first optical system.

FIG. 1 is a schematic cross sectional view of a principal portion of Embodiment 1 of scanning optical device according to the invention and used in an image forming apparatus that may be a laser printer or a digital copying machine as taken along the main-scanning direction. FIG. 2 is a schematic cross sectional view of a principal portion of the scanning optical device of FIG. 1 as taken along the sub-scanning direction. FIG. 3 is a schematic cross sectional view of a principal portion of the scanning optical device of FIG. 1, showing only part of the first optical system. Throughout FIGS. 1 through 3, same components are denoted respectively by same reference symbols.

Referring to FIGS. 1 through 3, there are shown a light source 1 typically comprising a semiconductor laser and a first lens (plano-convex lens) 2 having positive refractive power. The first lens 2 is a so-called collimator lens for transforming the light beam emitted from the light source 1 into a substantially collimated light beam. The first lens 2 and the light source 1 are unitized and contained in a same light source unit 3, which is rigidly fitted to the device. Reference symbol 4 denotes a second lens (concavo-plane lens) having negative refractive power. The second lens 4 is a spherical lens for transforming the light beam that is substantially collimated by the first lens 2 into a divergent light beam to enlarge the diameter of the light beam in the main-scanning direction. In this embodiment, the imaging position of the light beam on the surface to be scanned is regulated in the main-scanning direction by moving the second lens along the optical axis.

Reference symbol 5 denotes an aperture stop. The aperture stop 5 is used to trim the shape of the beam by limiting the light beam passing therethrough. Reference symbol 6 denotes a cylindrical lens. The cylindrical lens 6 shows predetermined refractive power only in the sub-scanning direction and is adapted to focus the light beam coming from the aperture stop 5 on the deflection surface (reflection surface) 12 of optical deflector 9, which will be described hereinafter, in the sub-scanning direction, as a linear image extending in the main-scanning direction. In this embodiment, the imaging position of the light beam on the surface to be scanned is regulated in the sub-scanning direction by moving the cylindrical lens 6 along the optical axis.

The mounting surfaces of the second lens 4 and the cylindrical lens 6 to be placed on respective seats are planes arranged in parallel with the optical axis of the first optical system 21 as will be discussed in greater detail hereinafter.

Note that the first lens 2, the second lens 4, the aperture stop 5 and the cylindrical lens 6 form a first optical system (optical system for incident light) 21 along with a second scanning lens 8 and a first scanning lens 7, which will be described hereinafter. A collimator system is formed in the main-scanning section by the three lenses including the first lens 2, the first scanning lens 7 and the second scanning lens 8.

In FIG. 1, reference symbol 9 denotes a rotary polygon mirror operating as optical deflector. The rotary polygon mirror 9 is driven by a drive means such as a motor to rotate at a constant rate in the sense of arrow A in FIG. 1

Reference symbol 22 denotes a second optical system (scanning lens system) having an fθ feature. The second optical system (scanning lens system) 22 includes an fθ lens system 23 comprising the first scanning lens 7 and the second scanning lens 8 having predetermined refractive power principally in the main-scanning direction and a cylindrical lens 10 having predetermined refractive power only in the sub-scanning direction. The first scanning lens 7 and the second scanning lens 8 are adapted to regulate the curvature of field in the main-scanning direction and, at the same time, operate with the fθ feature. Additionally, the first scanning lens 7 and the second scanning lens 8 operate as part of the first optical system 21. In other words, the first scanning lens 7 and the second scanning lens 8 are shared by the first optical system 21 and the second optical system 22. Reference symbol 11 denotes the surface of a photosensitive drum that is the surface to be scanned.

In Embodiment 1, the light beam optically modulated and emitted from the light source (semiconductor laser) 1 is transformed into a substantially collimated light beam by the first lens 2. The substantially collimated light beam is then transformed into a divergent light beam by the second lens 4. The divergent light beam is limited by the aperture stop 5 for its width before entering the cylindrical lens 6 of the optical system for incident light. The divergent light beam entering the cylindrical lens 6 is then converged in the sub-scanning section and transmitted through the second scanning lens 8 and the first scanning lens 7 to strike the deflection surface 12 of the rotary polygon mirror (optical deflector) 9 and form a substantially linear image (extending in the main-scanning direction) near the deflection surface 12. Note that, at this time, the light beam is made to strike the deflection surface 12 with a small angle of incidence of θ/2=0.8° relative to a plane perpendicular to the axis of rotation 13 of the optical deflector 9 (plane of rotation of the optical deflector) as viewed in the sub-scanning section as shown in FIG. 3 in order to isolate the light beam striking the optical deflector and the light beam deflected by the optical deflector from each other. Note also that the sub-scanning section contains the axis of rotation 13 of the rotary polygon mirror (optical deflector) 9 and the optical axis of the second optical system 22.

On the other hand, the divergent light beam entering the cylindrical lens 6 is transmitted through the latter without being modified in the main-scanning direction and then made to enter the second scanning lens 8 and the first scanning lens 7. It is then transformed into a substantially collimated light beam as it is transmitted through the second scanning lens 8 and the first scanning lens 7 to strike the deflection surface 12 of the rotary polygon mirror (optical deflector) 9. Note that the light beam is made to strike the deflection surface 12 substantially along the center line of the deflection angle of the rotary polygon mirror (optical deflector) 9 with a width sufficiently large relative to the facet width of the deflection surface 12 of the rotary polygon mirror (optical deflector) 9 as viewed in the main-scanning direction. In other words, Embodiment 1 of scanning optical device comprises an overfilled optical system.

The light beam deflected (reflected) by the deflection surface 12 of the rotary polygon mirror (optical deflector) 9 is then focussed on the surface 11 of the photosensitive drum (surface to be scanned) as spot of light by way of the first scanning lens 7, the second scanning lens 8 and the cylindrical lens 10 of the focussing optical system. Thus, the spot of light is made to scan the surface 11 of the photosensitive drum (surface to be scanned) in the sense of arrow B (main-scanning direction) as the rotary polygon mirror (optical deflector) 9 is driven to rotate in the sense of arrow A. As a result, an image is recorded on the surface 11 of the photosensitive drum (surface to be scanned) operating as recording medium.

As pointed out earlier, when an overfilled optical system is used as in Embodiment 1 and the scanning lens system is made to have a long focal length, the position of the image on the surface to be scanned is significantly affected by the surface accuracy of the lenses of the lens system in terms of the displacement of the image so that the lenses have to be processed with an enhanced level of accuracy. When, on the other hand, the diameter of the spot of light formed on the surface to be scanned is reduced in the main-scanning direction to achieve a high degree of resolution, the depth of focus is reduced to by turn reduce the tolerance for the displacement of the imaging position of the scanning lens system.

In view of this problem, the focal plane of the scanning lens system is regulated by arranging an off-focus detecting means (not shown) near the surface 11 of the photosensitive drum (surface to be scanned) in Embodiment 1. Thus, the second lens 4 is moved along the optical axis in the main-scanning section and the cylindrical lens 6 is moved along the optical axis in the sub-scanning section according to the signal transmitted from the off-focus detecting means in order to regulate the imaging position of the light beam on the surface to be scanned.

As shown in FIG. 3, the second lens 4 and the cylindrical lens 6 are provided with respective mounting surfaces to be placed on respective seats that are planes arranged in parallel with the optical axis. On the other hand, the scanning optical device is provided with planes 31 and 32 to which the lenses are fitted respectively. The planes 31 and 32 are held in parallel with the optical axis L1 of the first optical system (optical system for incident light). The mounting surfaces of the second lens 4 and the cylindrical lens 6 to be placed on respective seats are held in contact with the planes 31 and 32 respectively. Thus, the second lens 4 and the cylindrical lens 6 can be moved along the optical axis L1 by positionally shifting the second lens 4 and the cylindrical lens 6 on the respective planes 31 and 32. As described earlier, the focal plane of the scanning optical device is regulated by moving the lenses appropriately, while observing the imaging position on the surface to be scanned. Once the focal plane is satisfactorily regulated, the second lens 4 and the cylindrical lens 6 are rigidly secured to the respective planes 31 and 32 typically by means of an adhesive agent.

As described above, with Embodiment 1, the second lens 4 and the cylindrical lens 6 are used for regulating the focal plane of the scanning optical device so that the imaging position of the scanning optical device on the surface to be scanned can be regulated both in the main-scanning direction and in the sub-scanning direction simply by arranging a mechanically simple guide mechanism.

Additionally, in Embodiment 1, the light beam emitted from the light source 1 is made to strike the deflection surface 12 substantially along the center line of the deflection angle of the rotary polygon mirror (optical deflector) 9 in the main-scanning direction. More specifically, in Embodiment 1, the axis produced when the optical axis of the first optical system 21 is projected on the main-scanning section in the sub-scanning section is made to agree with the axis produced when the optical axis of the first scanning lens 7 and the second scanning lens 8 is projected on the main-scanning section in the sub-scanning section. As a result of this arrangement, the light beam striking the rotary polygon mirror is made to swing symmetrically as a function of the scanning angle of rotary polygon mirror to minimize the change in the diameter of the spot of light in the main-scanning direction and the change in the quantity of light.

Table 1 shows numerical values that can be used for the first optical system 21 of Embodiment 1. In Table 1, the surface number 1 refers to the light source and the surface numbers 2 through 11 refer to respective lens surfaces as viewed from the light source. The surface number 12 refers to the deflection surface whereas surface numbers 6s and 8m refer to respective cylindrical surfaces. Note that the suffixes s and m indicate the respective directions of refractive power, s referring to the sub-scanning direction while m referring to the main-scanning direction. In the table below, r, d and n respectively represent the radius of curvature of lens surface, the lens thickness or the air gap between surfaces and the refractive index of the lens material.

TABLE 1

| surface number | r | d | n |
|---|---|---|---|
| 1 | — | 36.05 | |
| 2 | ∞ | 3 | 1.796 |
| 3 | −30.03 | 10 | |
| 4 | −60.04 | 5 | 1.514 |
| 5 | ∞ | 19.9 | |
| 6s | 49.7 | 6 | 1.514 |
| 7 | ∞ | 238.9 | |
| 8m | 145.5 | 15 | 1.667 |
| 9 | ∞ | 41.5 | |
| 10 | −2098.5 | 4 | 1.514 |
| 11 | 263.3 | 25 | |
| 12 | deflection surface | | |

While Embodiment 1 of scanning optical device according to the invention comprises an overfilled optical system, the present invention is by no means limited thereto and the present invention can also be applied to a scanning optical device comprising an underfilled optical system.

Figure 4:
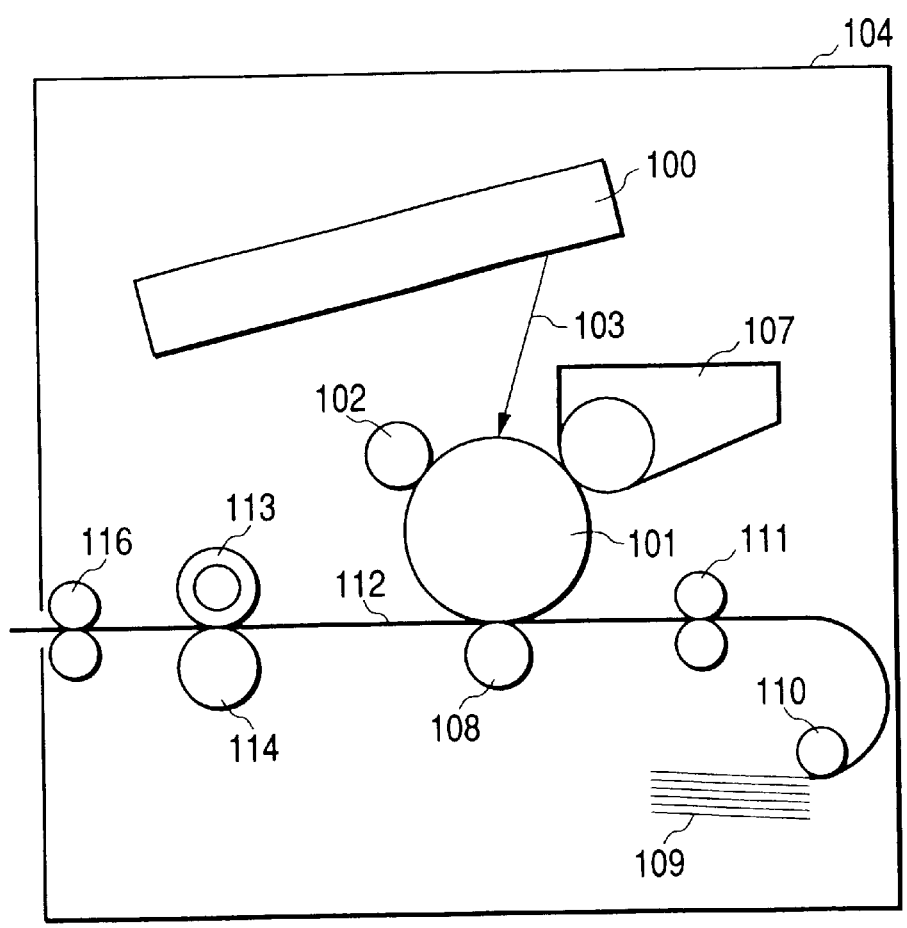
FIG. 4 is a schematic cross sectional view of an image forming apparatus comprising a scanning optical device according to the invention as taken along the sub-scanning direction.

FIG. 4 is a schematic cross sectional view of an image forming apparatus comprising a scanning optical device according to the invention taken along the sub-scanning direction. In FIG. 4, reference numeral 104 denotes the image forming apparatus. Reference numeral 100 denotes Embodiment 1 of scanning optical device according to the invention. Reference numeral 101 denotes a photosensitive drum operating as an electrostatic latent image carrier. A charging roller 102 adapted to charge the surface of the photosensitive drum 101 uniformly with electricity is arranged above and held in contact with the photosensitive drum 101. The electrically charged area of the surface of the photosensitive drum 101 located downstream relative to the contact line of the charging roller 102 and the drum 101 is scanned by the light beam 103 emitted from the scanning optical device 100.

The light beam 103 is modulated according to image data so that an electrostatic latent image is formed on the surface of the photosensitive drum 101 as the latter is irradiated with the light beam 103. The electrostatic latent image is then developed into a toner image by means of a developing device 107 arranged downstream relative to the area of the photosensitive drum 101 irradiated with the light beam 103 in the sense of rotation of the drum 101 and also held in contact with the photosensitive drum 101. The toner image is then transferred onto a sheet of paper 112 by a transfer roller 108 arranged vis-a-vis the photosensitive drum 101 at a position below the latter. The sheet of paper 112 is fed from a sheet cassette 109 arranged in front of the photosensitive drum 101 (right to the drum 101 in FIG. 4), although it may alternatively be fed with hand. A feed roller 110 is arranged at an end of the sheet cassette 109 and adapted to feed a sheet of paper at a time from the cassette 109 to the transfer route by way of a register roller 111.

Then, the sheet 112 now carrying the unfixed toner image is moved to a fixing device located behind the photosensitive drum 101 (left to the drum 101 in FIG. 4). The fixing device comprises a fixing roller 113 provided in the inside with fixing heater (not shown) and a press roller 114 for pressing the fixing roller 113 so that the toner image on the sheet 112 moved from the transfer section is fixed as the sheet is pressed and heated between the fixing roller 113 and the press roller 114. A pair of delivery rollers 116 are arranged behind the fixing roller 113 to deliver the sheet 112 now carrying a fixed image to the outside of the image forming apparatus.

The present invention can find various applications besides the above described embodiments. The present invention covers any such applications without departing from the scope of the invention specifically defined by the appended claims.

What is claimed is:

1. A scanning optical device comprising:

a light source;

an optical deflector having a deflection surface for deflecting a light beam emitted from said light source in a main-scanning direction;

a first optical system of optical elements for causing the light beam emitted from said light source to strike the deflection surface of said optical deflector; and a second optical system of an optical element for focusing the light beam deflected by said optical deflector on a surface to be scanned;

said optical elements of said first optical system including a first optical element for transforming the light beam emitted from said light source into a substantially collimated light beam, and a second optical element, said second optical element being movable along an optical axis to regulate an imaging position of the light beam on the surface to be scanned in the main-scanning direction, wherein said first optical system shares at least part of the optical element of said second optical system, and said second optical element and the shared optical element of said second optical system are adapted for causing a substantially collimated light beam to strike the deflection surface of said optical deflector in the main-scanning direction.

2. A scanning optical device according to claim 1, wherein the light beam striking the deflection surface of said optical deflector has a width in the main-scanning direction greater than that of the deflection surface in the main-scanning direction.

3. A scanning optical device according to claim 2, wherein the light beam emitted from said light source strikes the deflection surface of said optical deflector with a predetermined angle not equal to right angles in the sub-scanning direction.

4. A scanning optical device according to claim 2, wherein the light beam emitted from said light source strikes the deflection surface of said optical deflector substantially along a center line of a deflection angle of said optical deflector in the main-scanning direction.

5. A scanning optical device according to claim 1, wherein said first optical element has positive refractive power and said second optical element has negative refractive power.

6. A scanning optical device according to claim 1, wherein said first optical element is unitized with said light source.

7. A scanning optical device according to claim 1, wherein said optical deflector comprises a polygon mirror.

8. A scanning optical device according to claim 1, wherein said light source comprises a semiconductor laser.

9. A scanning optical device according to claim 1, wherein said first optical system further comprises a third optical element showing refractive power in a sub-scanning direction perpendicular to the main-scanning direction, and said third optical element is movable along the optical axis to regulate the imaging position of the light beam on the surface to be scanned.

10. A scanning optical device according to claim 9, wherein said second optical system is located between said optical deflector and said third optical element in the direction of the optical axis.

11. A scanning optical device according to claim 9, wherein said second optical element and said third optical element are constructed for independent movement along the optical axis.

12. A scanning optical device according to claim 11, wherein said device has a plane running in parallel with the optical axis of the first optical system, and wherein said second optical element and said third optical element are arranged on the plane.

13. A scanning optical device according to claim 12, wherein said second optical element comprises a spherical lens and has a mounting surface running in parallel with the optical axis.

14. A scanning optical device according to claim 1, wherein said second optical element includes a single lens.

15. A scanning optical device according to claim 1, wherein said second optical system includes a plurality of optical elements.

16. A scanning optical device according to claim 15, wherein the plurality of optical elements of said second optical system includes a first scanning lens, a second scanning lens and a cylindrical lens, whereas the optical elements of said first optical system include the first scanning lens and the second scanning lens.

17. A method of regulating an imaging position on a surface to be scanned of a scanning optical device comprising a light source, an optical deflector having a deflection surface for deflecting a light beam emitted from the light source in a main-scanning direction, a first optical system of optical elements for causing the light beam emitted from the light source to strike the deflection surface of the optical deflector, and a second optical system of an optical element for focusing the light beam deflected by the optical deflector on the surface to be scanned, the optical elements of the first optical system including a first optical element for transforming the light beam from the light source into a substantially collimated light beam, and a second optical element, wherein the first optical system shares at least part of the optical element of the second optical system, and the second optical element and the shared optical element of the second optical system are adapted for causing a substantially collimated light beam to strike the deflection surface of the optical deflector in the main-scanning direction, said method comprising the step of:

regulating the imaging position of the light beam on the surface to be scanned in the main-scanning direction by moving the second optical element along an optical axis.

18. A method according to claim 17, wherein the second optical system of the scanning optical device includes a plurality of optical elements.

19. A scanning optical device comprising:

a light source;

an optical deflector having a deflection surface for deflecting a light beam emitted from said light source in a main-scanning direction;

a first optical system of optical elements for causing the light beam emitted from said light source to strike the deflection surface of said optical deflector; and a second optical system of an optical element for focusing the light beam deflected by said optical deflector on a surface to be scanned;

said optical elements of said first optical system including a first optical element, and a second optical element, said second optical element being movable along an optical axis to regulate an imaging position of the light beam on the surface to be scanned in the main-scanning direction, wherein said first optical system shares at least part of the optical element of said second optical system.

20. A scanning optical device according to claim 19, wherein the light beam striking the deflection surface of said optical deflector has a width in the main-scanning direction greater than that of the deflection surface in the main-scanning direction.

21. An image forming apparatus comprising:

a scanning optical device according to either claim 1 or claim 19;

a photosensitive member arranged at the surface to be scanned;

a developing unit for developing an electrostatic latent image formed on the surface of said photosensitive member by the light beam made to scan the surface by means of said scanning optical device into a toner image;

a transfer unit for transferring the developed toner image onto a toner image receiving member; and a fixing unit for fixing the transferred toner image on the toner image receiving member.

22. A method of regulating an imaging position on a surface to be scanned of a scanning optical device comprising a light source, an optical deflector having a deflection surface for deflecting a light beam emitted from the light source in a main-scanning direction, a first optical system of optical elements for causing the light beam emitted from the light source to strike the deflection surface of the optical deflector, and a second optical system of an optical element for focusing the light beam deflected by the optical deflector on the surface to be scanned, the optical elements of the first optical system including a first optical element, and a second optical element, wherein the first optical system shares at least part of the optical element of the second optical system, said method comprising the step of:

regulating the imaging position of the light beam on the surface to be scanned in the main-scanning direction by moving the second element along an optical axis.

* * * * *

UNITED STATES PATENT AND TRADEMARK OFFICE
CERTIFICATE OF CORRECTION

PATENT NO.    : 6,507,427 B1                                           Page 1 of 1
DATED         : January 14, 2003
INVENTOR(S)   : Takeshi Yamawaki It is certified that error appears in the above-identified patent and that said Letters Patent is hereby corrected as shown below:

<u>Column 1,</u>
Line 29, "it s" should read -- its --;
Line 35, "D=$l\cdot\cos\theta$" should read -- D=1$\cdot\cos\theta$ --; and
Line 63, "t hat" should read -- that --.

<u>Column 2,</u>
Line 6, "f or" should read -- for --.

Signed and Sealed this

Twelfth Day of August, 2003

JAMES E. ROGAN
*Director of the United States Patent and Trademark Office*